Feb. 19, 1963 R. O. CHAMBERS ETAL 3,077,795
WIDE RANGE PLANETARY TRANSMISSION
Filed Aug. 1, 1960
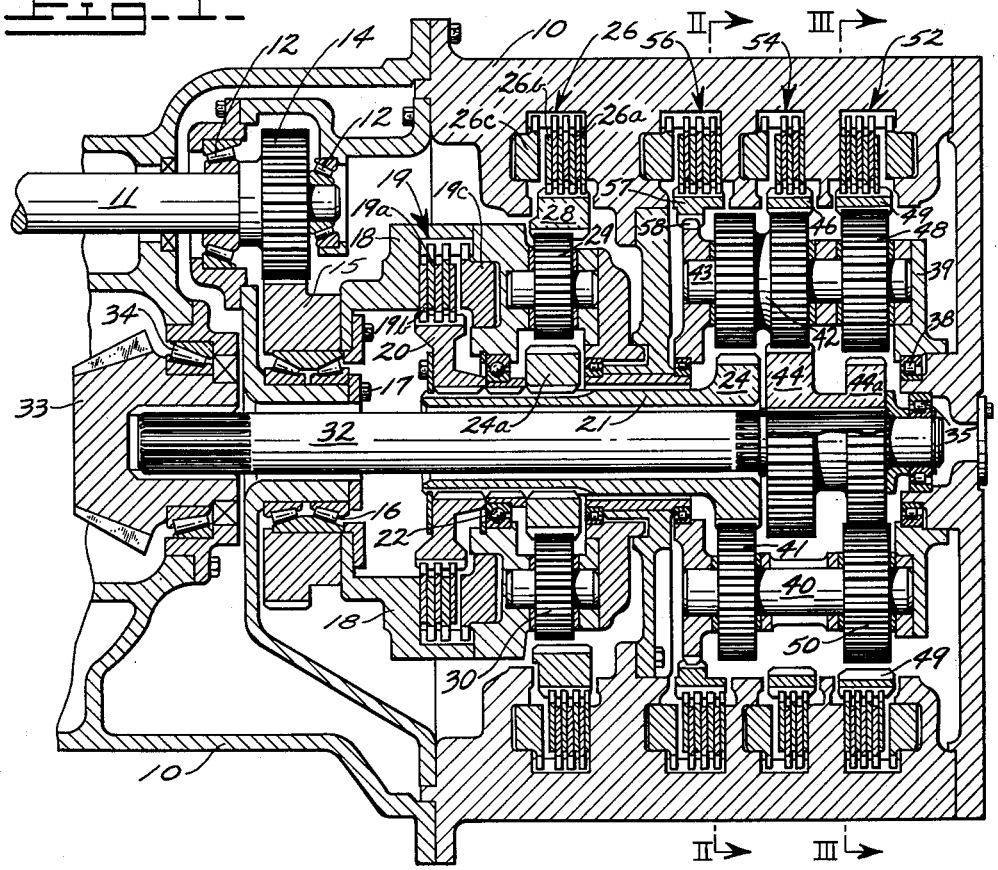
Fig-1-
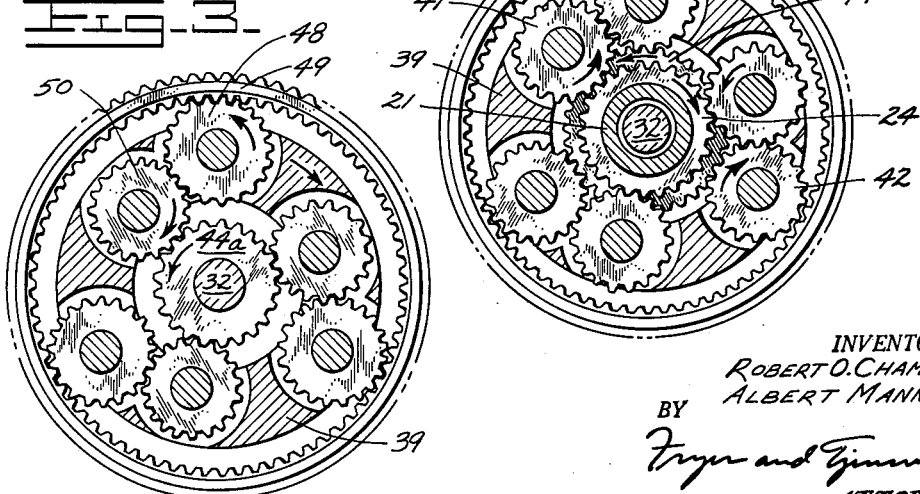
Fig-2-
Fig-3-
INVENTORS
ROBERT O. CHAMBERS
ALBERT MANNA
BY
Fryer and Zimmerman
ATTORNEYS United States Patent Office 3,077,795
Patented Feb. 19, 1963

3,077,795
WIDE RANGE PLANETARY TRANSMISSION
Robert O. Chambers, Elmwood, and Albert Manna, Aurora, Ill., assignors to Caterpillar Tractor Co., Peoria, Ill., a corporation of California
Filed Aug. 1, 1960, Ser. No. 46,646
7 Claims. (Cl. 74—764)

This invention relates to a wide range planetary transmission and, more particularly, to a planetary transmission capable of delivering power output at any one of a plurality of speed ratios selectable through the actuation of stationary, non-rotating clutches.

Previous efforts to develop wide range planetary transmissions for tractors or the like have not been entirely successful because of the difficulty in achieving large steps between gear ratios without excessively high component speeds.

It is, therefore, an object of this invention to provide a relatively simple transmission capable of producing large steps between gear ratios without excessively high component speeds, excessively high torques, and without a rotating clutch in the speed selecting trains.

It is a further object of this invention to provide a planetary transmission having a plurality of selectable gear ratios in both reverse and forward directions.

Other objects and advantages of this invention will become apparent from the specification following when read in connection with the accompanying drawings wherein:

FIG. 1 is a longitudinal section view of a transmission embodying this invention;

FIG. 2 is a section view taken along line II—II of FIG. 1; and

FIG. 3 is a section view taken along line III—III of FIG. 1.

The transmission of this invention includes a housing 10 rotatably carrying an input shaft 11 driven by an engine or other source of power (not shown). The input shaft 11 is mounted in suitable bearings 12 and carries thereon a pinion 14 engaged with and driving a larger reduction gear 15 rotatably carried in the housing 10 on suitable bearings 16.

Secured to the reduction gear 15 as by means of bolts 17 and rotatable therewith is the forward drive clutch carrier 18 internally splined to carry friction disc element 19a of forward drive clutch 19. Cooperating elements 19b are splined onto a hub 20, in turn splined to a hollow shaft 21 rotatably carried within the housing 10 by means of bearings 22. The forward directional clutch elements 19a and 19b may be operatively engaged by any suitable means such as a hydraulic medium acting upon an annular piston 19c. When the forward clutch 19 is thus engaged, the directional clutch carrier 18 is firmly locked to the hub 20 to drive the hollow shaft 21 and, hence, an input sun gear 24 integral therewith.

The reverse friction engaging means 26 is of the stationary type functioning as a brake and, when friction discs 26a and 26b are engaged by means of an annular piston 26c, they lock a ring gear 28 against rotation in the housing 10 and thereby causes a planet gear 29 on the rotating forward clutch carrier 18 to walk around the ring gear and, through idler gear 30, drive the reverse sun gear 24a also splined onto the hollow intermediate shaft 21. Preferably, the speed ratio between input shaft 11 and hollow shaft 21, i.e. input sun gear 24 is substantially the same whether the forward or reverse clutch 19 or 26 is engaged.

An output shaft 32 extends through the hollow intermediate shaft 21 and projects from the housing 10 at the same end as does input shaft 11.

Splined onto the projecting end of the output shaft 32 is a suitable power take-off such as bevel pinion gear 33. Output shaft 32 is rotatably carried in frame 10 in suitable bearings 34 and 35.

Rotatably mounted within the housing 10 on bearings 38 is a planet gear carrier 39. Rotatably mounted on carrier 39 about a fixed shaft 40 is a reversing or idler planet gear 41 enmeshed with input sun gear 24 and driving a primary cluster planet gear 42 freely rotatable on fixed shaft 43. The output portion of cluster planet 42 meshes with and drives output sun gear 44 splined on the output shaft 32. Cluster planet gear 42 also meshes with a ring gear 46 normally rotatable in the housing 10. Also rotatably carried on the planet carrier 39 is a secondary planet gear 48 enmeshed with a normally rotatable ring gear 49 and a reversing idler 50 which, in turn, is enmeshed with a secondary output sun gear 44a that rotates with, and may be integral with, primary output sun gear 44.

Associated with the ring gear 49 is a low speed drive activating brake shown generally at 52 but which may be engaged by means similar to those employed in directional selection clutches 19 and 26. When low or first speed brake 52 is engaged it locks the ring gear 49 associated therewith against rotation in the housing 10 thereby to force secondary planet 48 to roll therearound. Similarly, a high speed brake 54 is associated with ring gear 46 so that when it is actuated the primary planet cluster gear 42 is forced to roll about the then stationary ring gear 46. There is also provided a middle or second speed range brake 56 which, when engaged, locks a ring 57 to the housing 10 and, because the ring is splined at 58 onto the carrier 39, the engaged clutch 56 holds the planet carrier 39 against rotation within the housing 10.

The operation of the transmission may now be described. In starting, either the forward or reverse brake 19 or 26 is engaged so that the input sun gear 24 may be rotated in the appropriate direction for desired directional drive of output shaft 32. With the forward clutch 19 engaged the input sun gear 24 is rotated directly by the reduction gear 15 through the clutch carrier 18 and hub 20 on hollow intermediate shaft 21. With the reverse brake 26 engaged to lock the ring gear 28 to the housing the input sun gear 24 is driven through the medium of planetary gearing 29, 24a. Then, the speed ratios may be selected and, for low or first speed operation, the brake 52 is engaged. Then, torque is transmitted by input sun gear 24 through idler 41 to cluster primary planet gear 42. This causes a torque to be transmitted to output sun gear 44 rotating it in the direction opposite to that of input sun gear 24 and, at the same time, produces an opposite torque in the planet carrier 39 tending to rotate it in the same direction as that of input sun gear 24. Thus, referring to FIG. 2, with input sun gear 24 rotating in a clockwise direction, as indicated by the arrows, idlers 41 will rotate in a counter-clockwise direction driving primary planet cluster 42 in a clockwise direction which in turn drives output sun gear 44 in a counter-clockwise direction. With the load on output shaft 32 it tends to resist rotation, but since cluster gear 42 is being positively driven it rolls around retarded output sun 44 in a reverse direction, i.e. clockwise, rotating the planet carrier 39 in the same direction as that of input sun 24. As planet carrier 39 rotates in a clockwise direction (FIG. 3) the secondary planets 48 are caused to roll in counter-clockwise rotation around the then stationary ring gear 49 to drive the secondary output sun gear 44a in a counter-clockwise direction through reversing idler 50. Thus, in low gear the transmission of power is divided through two paths, one through primary cluster planet 42 to primary sun 44 and the other through secondary planet 48 to integral secondary output sun 44a. This arrangement permits the use of smaller gears with consequent reduced gear tooth loads than would be experienced if but a single gear train was employed to provide the same speed reduction. Because the carrier 39 is rotating in a direction opposite to that of output sun 44 the speed ratio between cluster gear 42 and output sun 44 is diminished and a lower speed ratio is realized.

In second or medium speed the brake 56 is engaged to lock ring 57 and, because of the spline connection, the carrier 39 is also held against rotation. Then, input sun 24 will drive output sun 44 through idler 41 and cluster gear 42 while ring gears 46 and 49 are idle. Thus, in middle gear the speed ratio is determined directly from the gear ratio of the gear train described and it is not modified by the influence of a rotating planet carrier.

In third or high speed, the brake 54 is engaged to lock the primary ring gear 46 against rotation in the housing 10 so that the rotation of cluster gear 42 produced by input sun 24 through idler 41 causes the cluster gear 42 to roll around the then stationary ring gear 46 in a counter-clockwise direction shown in FIG. 2. This increases the rate of counter-clockwise rotation delivered by the clockwise rotation of cluster gear 42, producing an overdrive.

Thus, in this transmission there is employed a single planet gear carrier 39 which, in low speed, is rotated in the opposite direction to that of output sun gear 46; in second speed is held stationary; and in third or high speed is rotated in the same direction. But in all three speeds, the output sun 44 is rotated in the direction opposite to that of the input sun 24. This arrangement provides lower relative speeds in the other components and particularly the disengaged brakes, minimum torque on the engaged brake, and a wide range of output speeds without a rotating clutch in the speed selecting trains. In order to provide any one of these desirable features in a non-reversing transmission it would be necessary to sacrifice one or more of the others.

While there has been described a preferred embodiment of this invention, it is obvious that modifications will occur to those skilled in the art and we do not intend to be limited to the precise details shown and described, but claim as this invention all embodiments and modifications coming within the scope of the appended claims.

Having described our invention we claim:

1. A planetary gear transmission comprising:
 coaxial driving and unitary pair of driven sun gears,
 a planet carrier rotatable about said sun gears,
 a primary planet means rotatably mounted on said carrier to be driven by said driving sun and to drive one of said driven sun gears,
 secondary planet means rotatably mounted on said carrier in driving engagement with the other of said driven sun gears,
 a rotatably mounted primary ring gear operatively engaged with said primary planet means and a rotatably mounted secondary ring gear operatively engaged with said secondary planet means,
 low speed brake means operative when engaged to lock said secondary ring gear against rotation,
 high speed brake means operative when engaged to lock said primary ring gear against rotation,
 and medium speed brake means operative when engaged to lock said planet carrier against rotation.

2. The planetary gear transmission defined in claim 1 including reversing gear means for driving said driven sun in the direction opposite to that of said driving sun.

3. The planetary gear transmission defined in claim 2 including directional clutch means operatively connected to said reversing gear means and selectively engaged for rotating said driving sun gear in either direction.

4. A planetary gear transmission comprising input and output shafts,
 a driving sun gear on said input shaft and a pair of driven sun gears on said output shaft,
 a planet carrier rotatable about said input and output shafts,
 a primary planet gear assembly rotatably mounted on said carrier to be driven by said driving sun and to drive one of said driven suns,
 secondary planet gears rotatably mounted on said carrier in driving engagement with the other of said driven suns,
 a primary ring gear operatively engaged with said primary planet gear assembly and rotatable about said input and output shafts,
 a secondary ring gear operatively engaged with said second planet gear assembly and rotatable about said input and output shafts,
 a low speed brake operative when energized to lock said secondary ring gear against rotation, and
 a high speed brake operative when energized to lock said primary ring gear against rotation.

5. The planetary gear transmission defined in claim 4 including medium speed brake means for locking said carrier against rotation.

6. A planetary gear transmission comprising coaxial input and output shafts,
 a driving sun gear on said input shaft and a pair of driven sun gears on said output shaft,
 a carrier rotatable about said input and output shafts,
 primary and secondary planetary gears rotatably mounted on said carrier, said primary planetary gear being driven by said driving sun gear,
 a direction reversing idler rotatably mounted on said carrier to be driven by said secondary planetary gear,
 each of said primary planetary gear and said idler being engaged with a respective one of said driven sun gears,
 a first ring gear engaged by said primary planet gear and rotatable about said input and output shafts,
 a second ring gear engaged by said secondary planet gear and rotatable about said input and output shafts,
 a low speed brake selectively operated to lock said second ring gear against rotation, and
 a high speed brake selectively operated to lock said first ring gear against rotation.

7. The planetary gear transmission defined in claim 6 including a medium speed brake means for locking said carrier against rotation.

References Cited in the file of this patent
UNITED STATES PATENTS

| 2,251,625 | Hale | Aug. 5, 1941 |
| 3,021,729 | Chambers et al. | Feb. 20, 1962 |

FOREIGN PATENTS

| 328,472 | France | Jan. 17, 1903 |